United States Patent
Nakayama et al.

(10) Patent No.: US 10,226,803 B2
(45) Date of Patent: Mar. 12, 2019

(54) EMBOSSED THERMOPLASTIC RESIN SHEET, ENGRAVED ROLL, ENGRAVED ROLL MANUFACTURING METHOD, LAMINATED GLASS INTERLAYER, AND LAMINATED GLASS

(71) Applicant: SEKISUI CHEMICAL CO., LTD., Osaka (JP)

(72) Inventors: Kazuhiko Nakayama, Shiga (JP); Hiroaki Inui, Roermond (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/302,040

(22) PCT Filed: Jun. 25, 2015

(86) PCT No.: PCT/JP2015/068397
§ 371 (c)(1),
(2) Date: Oct. 5, 2016

(87) PCT Pub. No.: WO2015/199191
PCT Pub. Date: Dec. 30, 2015

(65) Prior Publication Data
US 2017/0144362 A1    May 25, 2017

(30) Foreign Application Priority Data
Jun. 25, 2014   (JP) .................................. 2014-130492

(51) Int. Cl.
*B21B 27/00* (2006.01)
*B24C 1/04* (2006.01)
(Continued)

(52) U.S. Cl.
CPC ............ *B21B 27/005* (2013.01); *B21B 27/00* (2013.01); *B24C 1/04* (2013.01); *B29C 59/04* (2013.01);
(Continued)

(58) Field of Classification Search
CPC ... B29C 59/04; B32B 27/30; B32B 17/10761; B32B 17/10587; B32B 3/30;
(Continued)

(56) References Cited

U.S. PATENT DOCUMENTS 4,787,837 A * 11/1988 Bell ....................... B21B 27/005
264/284
2003/0045412 A1 * 3/2003 Schulz ....................... B31F 1/07
492/30
(Continued)

FOREIGN PATENT DOCUMENTS

| CN | 101279506 | 10/2008 |
|---|---|---|
| CN | 101410341 | 4/2009 |

(Continued)

OTHER PUBLICATIONS

International Search Report dated Aug. 18, 2015 in corresponding International Application No. PCT/JP2015/068397.
(Continued)

*Primary Examiner* — Nathan L Van Sell
(74) *Attorney, Agent, or Firm* — Wenderoth, Lind & Ponack, L.L.P.

(57) ABSTRACT

The present invention aims to provide an embossed thermoplastic resin sheet that is capable of enhancing deaeration during production of laminated glass and suppressing optical distortion of the resulting laminated glass to improve the visibility when used as an interlayer film for laminated glass. The present invention also relates to an engraved roll used for production of the embossed thermoplastic resin sheet, a
(Continued)

production method of the engraved roll, an interlayer film for laminated glass including the embossed thermoplastic resin sheet, and a laminated glass. The present invention relates to an embossed thermoplastic resin sheet having a large number of recesses and a large number of projections on at least one surface, the recesses each having a groove shape with a continuous bottom and being regularly arranged side by side in parallel with one another, the thermoplastic resin sheet having not more than three defects of the projections per $mm^2$ on the surface.

1 Claim, 3 Drawing Sheets

(51) Int. Cl.
    *B29C 59/04*    (2006.01)
    *B32B 27/30*    (2006.01)
    *B32B 17/10*    (2006.01)
    *B32B 3/30*     (2006.01)
    *B32B 17/06*    (2006.01)

(52) U.S. Cl.
    CPC .............. *B32B 3/30* (2013.01); *B32B 17/064* (2013.01); *B32B 17/10587* (2013.01); *B32B 17/10761* (2013.01); *B32B 27/30* (2013.01); *B32B 2307/412* (2013.01)

(58) Field of Classification Search
    CPC ... B32B 17/064; B32B 2307/412; B24C 1/04; Y10T 29/49544; Y10T 29/4956; B21B 27/00; B21B 27/005
    See application file for complete search history.

(56) References Cited

U.S. PATENT DOCUMENTS

| | | |
|---|---|---|
| 2004/0191482 A1 | 9/2004 | Nakajima et al. |
| 2009/0267270 A1 | 10/2009 | Murakami et al. |
| 2010/0233453 A1 | 9/2010 | Hashimoto |
| 2013/0337247 A1 | 12/2013 | Kitano et al. |

FOREIGN PATENT DOCUMENTS

| | | |
|---|---|---|
| CN | 103391907 | 11/2013 |
| EP | 0 525 403 | 2/1993 |
| JP | 9-1660 | 1/1997 |
| JP | 9-50764 | 2/1997 |
| JP | 2001-48599 | 2/2001 |
| JP | 2002-154156 | 5/2002 |
| JP | 2004-114311 | 4/2004 |
| JP | 2008-254360 | 10/2008 |
| JP | 2010-234513 | 10/2010 |

OTHER PUBLICATIONS

Extended European Search Report dated Jan. 2, 2018 in European Application No. 15812293.7.

* cited by examiner (a)

Rotational direction of roll (b)

(a)

Rotational direction of roll (b)

(a)

Axis angle of recessed groove (b)

(a)

(b)

(a)

(b)

EMBOSSED THERMOPLASTIC RESIN SHEET, ENGRAVED ROLL, ENGRAVED ROLL MANUFACTURING METHOD, LAMINATED GLASS INTERLAYER, AND LAMINATED GLASS

TECHNICAL FIELD

The present invention relates to an embossed thermoplastic resin sheet that is capable of enhancing deaeration during production of laminated glass and suppressing optical distortion of the resulting laminated glass to improve the visibility when used as an interlayer film for laminated glass. The present invention also relates to an engraved roll used for production of the embossed thermoplastic resin sheet, a production method of the engraved roll, an interlayer film for laminated glass including the embossed thermoplastic resin sheet, and a laminated glass.

BACKGROUND ART

Embossed thermoplastic resin sheets in which a large number of minute projections and recesses (embossment) are formed on surfaces of thermoplastic resin sheets are widely used as interlayer films for laminated glass and for other applications. For example, a large number of minute projections and recesses are formed on a surface of an interlayer film for laminated glass for the purpose of preventing blocking between films, improving handleability thereof upon stacking of a glass sheet and the interlayer film (slipperiness between the film and a glass sheet), and enhancing deaeration upon lamination of the film and the glass sheet. Particularly, in a case where the recesses among the recesses and the projections have a groove shape with a continuous bottom (hereafter, also referred to as "recesses in the shape of engraved lines") and are regularly arranged side by side in parallel with one another, such a sheet can exhibit significantly excellent deaeration properties (see Patent Literature 1, for example).

However, use of such an embossed thermoplastic resin sheet as an interlayer film for laminated glass causes optical distortion in the resulting laminated glass, resulting in poor visibility.

Even in the case of a thermoplastic resin sheet on which recesses in the shape of engraved lines are regularly arranged in parallel with one another, the sheet used as an interlayer film for laminated glass may fail to exhibit its deaeration properties sufficiently depending on the shape of the surface or conditions for lamination of the sheet with a glass sheet during production of laminated glass.

CITATION LIST

Patent Literature

Patent Literature 1: JP 2001-48599 A

SUMMARY OF INVENTION

Technical Problem

In consideration of the state of the art, the present invention aims to provide an embossed thermoplastic resin sheet that is capable of enhancing deaeration during production of laminated glass and suppressing optical distortion of the resulting laminated glass to improve the visibility when used as an interlayer film for laminated glass, an engraved roll used for production of the embossed thermoplastic resin sheet, a production method of the engraved roll, an interlayer film for laminated glass including the embossed thermoplastic resin sheet, and a laminated glass.

Solution to Problem

The present invention relates to an embossed thermoplastic resin sheet having a large number of recesses and a large number of projections on at least one surface, the recesses each having a groove shape with a continuous bottom and being regularly arranged side by side in parallel with one another, the thermoplastic resin sheet having not more than three defects of the projections per $mm^2$ on the surface.

The present invention is specifically described in the following.

The embossed thermoplastic resin sheet of the present invention has a large number of recesses and a large number of projections on at least one surface. The recesses have a groove shape with a continuous bottom (recesses in the shape of engraved lines) and are regularly arranged side by side in parallel with one another. Such a surface shape enables the embossed thermoplastic resin sheet of the present invention to ensure deaeration properties during production of laminated glass when used as an interlayer film for laminated glass.

The large number of recesses and the large number of projections may be formed only on one surface but preferably on both surfaces of the embossed thermoplastic resin sheet as deaeration properties are significantly improved.

In the embossed thermoplastic resin sheet of the present invention, the thermoplastic resin sheet having not more than three defects of the projections per $mm^2$ on the surface.

The present inventors found out that, when an embossed thermoplastic resin sheet with many defects of projections is used as an interlayer film for laminated glass in production of laminated glass, optical distortion may occur due to local variation of the film thickness to possibly lower the visibility of the resulting laminated glass. Especially in a case where the interlayer film for laminated glass has a multilayer structure, unevenness due to the variation of the film thickness is transferred to each interface between the layers in the interlayer film to create distortion of the interface, which may result in more apparent optical distortion. The present inventors also found out that defects of the projections present on the surface may block the passage of gas during production of laminated glass, lowering the deaeration properties.

When the thermoplastic resin sheet are controlled to have not more than three defects of the projections per $mm^2$ on the surface, the optical distortion of laminated glass can be suppressed to improve the visibility of the laminated glass, while enhancing deaeration during production of the laminated glass. The thermoplastic resin sheet has more preferably not more than one defect, still more preferably not more than 0.5 defects, particularly preferably not more than 0.1 defects, most preferably not more than 0.08 defects of the projections per $mm^2$ on the surface. The lower limit of the number of defects of the projections is not particularly limited. Practically, the thermoplastic resin sheet has 0.0001 defects of the projections per $mm^2$ on the surface.

In a case where a thermoplastic resin sheet is not produced through a step of forming projections and recesses using an engraved roll that is prepared by a blasting method, such as a thermoplastic resin sheet having projections and recesses formed using an engraved roll that is not prepared by a blasting method and a thermoplastic resin sheet having projections and recesses formed only by control of melt fracture, the thermoplastic resin sheet is considered to have zero defects of the projections per mm$^2$ on the surface.

The number of defects of the projections in the pattern of projections and recesses on the embossed thermoplastic resin sheet per unit area can be determined as follows. Specifically, the surface roughness of the embossed thermoplastic resin sheet is measured with a three-dimensional profilometer (e.g., "KS-1100" produced by KEYENCE CORPORATION, head: model "LT-9510VM") in a 5 mm×5 mm field of view. In the obtained image data, Ra of the apex portions of the projections and a height difference r are measured in a direction in parallel with the projections. The number of portions where r is higher than Ra by 30 μm or more is counted as defects. Here, Ra refers to the arithmetic mean roughness Ra specified in JIS B-0601 (1994). Ra is a value calculated using "KS-Analyzer Ver. 2.00", analysis software included with the three-dimensional profilometer, in the line roughness measurement mode based on the roughness profile data obtained by drawing a measuring line from one end to the other end of the field of view in a direction in parallel with the direction in which the apex portions of the projections are continuous. The height difference r is determined as follows. The obtained roughness profile is divided at 500-μm intervals into plural sections starting from the upper side or the left side of the field of view with which an apex portion of a projection is in contact. The difference between the maximum height and the minimum height in each section is taken as the height difference r. The height difference of all the projections present in the field of view is determined by the same method. The correction conditions employed for obtaining the roughness profile data are cut-off value of 2.5 mm, no height smoothing, no tilt correction, and automatic range setting. The measurement conditions other than the field of view are as follows: stage feed condition: continuous; scan direction: bi-directional scanning; leading axis: X axis; stage travel rate: 250.0 μm/s; axis feed rate: 10000.0 μm/s; measuring pitch of X axis: 2.0 μm; and measuring pitch of Y axis: 2.0 μm. By the method described above, the number of defects is counted at at least 10 arbitrary sites, and the arithmetic mean of the obtained numbers is taken as the average value. Especially, the arithmetic mean is preferably obtained by preparing a roll of the resulting thermoplastic resin sheet and counting the number of defects at at least three points on each of the positions at ¼, 2/4, and ¾ of the roll from both ends in the width direction. The apex portion in this case refers to a range corresponding to 10% of the length of a shortest straight line connecting the deepest bottoms of two adjacent recesses in the field of view, centered on the middle of the straight line connecting the deepest bottoms.

Ra of the apex portions of the projections is preferably 4.5 μm or less. When Ra of the apex portions of the projections is 4.5 μm or less, excellent deaeration properties can be exhibited in production of laminated glass.

Ra of the apex portions of the projections is preferably 1.0 μm or more. When Ra of the apex portions of the projections is 1.0 μm or more, blocking of interlayer films for laminated glass when they are stored in a stack can be suppressed.

The recesses in the shape of engraved lines have a roughness Rz of preferably 10 μm or more and 60 μm or less. When the roughness Rz of the recesses in the shape of engraved lines is within the above range, further excellent deaeration properties can be exhibited. The roughness Rz of the recesses in the shape of engraved lines is more preferably 45 μm or less, still more preferably 40 μm or less, and more preferably 15 μm or more, still more preferably 20 μm or more.

As used herein, the roughness (Rz) of the recesses in the shape of engraved lines is Rz specified in JIS B-0601 (1994). The roughness (Rz) can be obtained by measuring perpendicularly so as to traverse the direction in which the recesses in the shape of engraved lines are continuous. The measurement device may be, for example, "Surfcorder SE300" produced by Kosaka Laboratory Ltd. The measurement may be performed at a cut-off value of 2.5 mm, a standard length of 2.5 mm, a measurement length of 12.5 mm, a spare length of 2.5 mm, and a stylus feed rate of 0.5 mm/sec, with a stylus having a tip radius of 2 μm and a tip angle of 60°. The measurement is performed at 23° C. and 30 RH %.

Any thermoplastic resin sheet may be used as a raw material of the embossed thermoplastic resin sheet of the present invention, and examples thereof include a thermoplastic resin sheet containing a polyvinyl acetal resin and a plasticizer.

The embossed thermoplastic resin sheet of the present invention can be produced by passing a thermoplastic resin sheet as a raw material between engraved rolls, while being heated, so that an uneven pattern on the engraved rolls is transferred to the thermoplastic resin sheet.

The engraved rolls are commonly prepared by forming an uneven pattern on the surface of a metal roll by a treatment such as carving or pressing of a engraving mill (mother mill) preliminary subjected to carving to a metal roll for transferring a pattern on the engraving mill. Moreover, a blast material may be sprayed to the surface of the engraved roll with an aim of concurrently forming a pattern of minute projections and minute recesses in addition to the pattern of projections and recesses formed by engraving.

As a result of intensive studies, the present inventors found out that defects of the projections present on the surface of an embossed thermoplastic resin sheet are caused by defective transfer in which an uneven pattern is not accurately transferred upon transferring of the pattern from an engraved roll. The present inventors also found out that such defective transfer is caused by blast material pieces remaining in recessed grooves on the engraved roll. In the blasting method, an uneven pattern is formed by spraying a blast material to the surface of a raw material roll while rotating the raw material roll. In a case where the engraved roll has recessed grooves and the recessed grooves have an acute bottom or a very narrow flat bottom, the blast material may clog and remain in the recessed grooves during the above treatment. When an embossed thermoplastic resin sheet is produced using such an engraved roll with the blast material remaining thereon, the shape of the blast material may be transferred to the projections of the embossed thermoplastic resin sheet which are formed in correspondence with the recessed grooves on the engraved roll. Accordingly, the projections are deformed to have abnormal projections and recesses on the apex portions.

The present inventors made further intensive studies to find out that, even in the case of production by the blasting method, the use of an engraved roll having, per unit area on average, not more than three blast material pieces with a maximum length of 10 μm or more in the grooves per mm$^2$ of the engraved roll enables significant reduction of occurrence of defective transfer, resulting in production of the embossed thermoplastic resin sheet of the present invention having not more than three defects of the projections per mm$^2$ on the surface.

The present invention also encompasses an engraved roll formed by a blasting method, the engraved roll having an uneven pattern including recessed grooves arranged in parallel with one another in the circumferential direction, the engraved roll having, per unit area on average, not more than three pieces of a blast material with a maximum length of 10 μm or in the recessed grooves per mm² of the engraved roll.

The engraved roll of the present invention is made of a metal such as iron, carbon steel, alloyed steel, nickel-chromium steel, or chromium steel. For excellent durability, the engraved roll is preferably made of carbon steel or alloyed steel.

The engraved roll of the present invention has an uneven pattern including recessed grooves arranged on the surface in parallel with one another in the circumferential direction. The use of such an engraved roll enables production of an embossed thermoplastic resin sheet. The engraved roll of the present invention preferably has an uneven pattern including projected ridges and recessed grooves arranged on the surface in parallel with one another in the circumferential direction.

The pattern of projections and recesses on the engraved roll of the present invention needs to provide an interlayer film for laminated glass (embossed thermoplastic resin sheet) with a pattern that exhibits favorable slipperiness with a glass surface when the interlayer film is tightly attached to a glass sheet and facilitates deaeration between the glass surface and the interlayer film. For the above purpose, the pattern of projections and recesses includes recessed grooves formed in parallel with one another in the circumferential direction of the engraved roll. In the case where projected ridges and recessed grooves are formed in parallel with one another on the surface in the circumferential direction of the engraved roll, the projected ridges may be formed in the shape of a lattice for the purpose of improving the adhesiveness to glass. The width and height of projected ridges and the intervals between the projected ridges may be determined as appropriate for adjusting deaeration properties and self-adhesiveness.

The state "recessed grooves are formed in parallel with one another in the circumferential direction" refers not only to a case where recessed grooves are formed in a direction completely in parallel with the circumferential direction, i.e., a direction perpendicular to the rotation axis of the engraved roll, but also to a case where recessed grooves are formed in parallel with one another at a predetermined angle relative to the circumferential direction.

The engraved roll of the present invention has, per unit area on average, not more than three blast material pieces with a maximum length of 10 μm or more in the recessed grooves per mm² of the engraved roll. Such an engraved roll enables production of an embossed thermoplastic resin sheet having an uneven pattern accurately transferred thereon with few defects, significantly reducing occurrence of defective transfer. The engraved roll has, per unit area on average, preferably not more than two blast material pieces, more preferably not more than one blast material piece with a maximum length of 10 μm or more in the recessed grooves per mm² of the engraved roll. The lower limit of the number of blast material pieces with a maximum length of 10 μm or more in the recessed grooves, per unit area on average, is not particularly limited. Practically, the engraved roll has, per unit area on average, 0.0001 blast material pieces with a maximum length of 10 μm or more in the recessed grooves per mm² of the engraved roll. In the case of an engraved roll prepared not by a blast method, such an engraved roll is considered to have, per unit area on average, zero blast material pieces with a maximum length of 10 μm or more in the recessed grooves per mm² of the engraved roll.

The "blast material with a maximum length of 10 μm or more" is herein counted in consideration of the size of remaining blast material pieces that may actually cause defective transfer. The maximum length as used herein refers to the maximum length of a blast material observed in a recessed groove of the engraved roll with a microscope. More specifically, the maximum length as used herein refers to the length between two farthest points on the circumference of one blast material observed with a microscope.

The number of blast material pieces in the recessed grooves per unit area is determined by counting the number of remaining blast material pieces with a maximum length of 10 μm or more present in a range of 1290 μm×1024 μm in a recessed groove portion of the engraved roll photographed at a 200× magnification with a microscope (e.g., "Dino-Lite Pro2, model: DILITE80" produced by AnMo Electronics corporation). The number of remaining blast material pieces is counted by the above method at at least 30 arbitrary sites, and the arithmetic mean of the obtained numbers is taken as the average number. Especially, the arithmetic mean is preferably obtained by counting the number of remaining materials at at least 10 points on each of the positions at ¼, 2/4, and ¾ of the obtained engraved roll from both ends in the width direction in such a manner that each field of view does not overlap with each other.

The engraved roll of the present invention is produced by a blasting method. The present inventors made intensive studies to find out that when a predetermined method for producing an engraved roll is employed, the produced engraved roll has, per unit area on average, not more than three blast material pieces with a maximum length of 10 μm or more in the recessed grooves per mm² of the engraved roll.

The present invention also encompasses a method for producing an engraved roll by a blasting method, the method including: a step of forming an uneven pattern by spraying a blast material to a raw material roll having recessed grooves formed in parallel with one another in the circumferential direction, the blasting material being sprayed at an angle of 20° or smaller relative to a line connecting the tip of a blast gun and the axis of the raw material roll while rotating the raw material roll; and a step of removing the blast material remaining in the recessed grooves by spraying the blast material at an angle of ±20° or smaller relative to a tangential plane direction (tangential direction at the vertical section of the roll) of the roll and in a direction in parallel with the recessed grooves of the roll, while rotating the roll having the uneven pattern.

The method for producing an engraved roll of the present invention is described with reference to FIGS. 1 and 2.

The method for producing an engraved roll of the present invention first includes a step of forming an uneven pattern by spraying a blast material to a raw material roll having recessed grooves formed in parallel with one another in the circumferential direction, the blast material being sprayed at an angle of 20° or smaller relative to the line connecting the tip of a blast gun and the axis of the raw material roll while rotating the raw material roll (FIGS. 1(a), 1(b)).

In FIG. 1, a blast gun 2 sprays a blast material to a rotating roll 1. The blast material is sprayed at an angle of 20° or smaller relative to the line connecting the tip of the blast gun and the axis of the roll.

Any raw material roll may be used. A preferred raw material roll is a mirror-finished iron roll on which recessed grooves are formed in parallel with one another in the circumferential direction by milling or carving.

The recessed grooves are not limited. When the bottom of a recessed portion is wide, the blast material is less likely to clog the groove. When the bottom has a width of 5 µm or more, the blast material is less likely to clog the groove, though it depends on the particle size or the kind of the blast materials. When the bottom has a width of 15 µm or more, the blast material is further less likely to clog the groove. When the bottom has a width of 40 µm or more, the blast material is still further less likely to clog the groove.

When the recessed portion has a larger angle of inclination, the recessed portion has a wider groove at a point close to the surface layer of the roll, which prevents clogging of a shallow part of the roll with the blast materials. Accordingly, the blast material is less likely to clog the groove. Specifically, when the angle of inclination is 5° or more, the blast material is less likely to clog the groove. When the angle of inclination is 15° or more, the blast material is further less likely to clog the groove. When the angle of inclination is 30° or more, the blast material is still further less likely to clog the groove.

The recessed groove with a greater groove height can further prevent defective transfer to the thermoplastic resin sheet. When the groove height of the recessed groove is 150 µm or more, defective transfer to the thermoplastic resin sheet can be still further prevented. When the groove height of the recessed groove is 250 µm or more, defective transfer to the thermoplastic resin sheet can be furthermore prevented. When the groove height of the recessed groove is 330 µm or more, defective transfer to the thermoplastic resin sheet can be still furthermore prevented.

The recessed grooves are preferably formed at a larger pitch interval for the following reason. When the pitch interval between the recessed grooves is larger, the number of grooves per unit area is smaller. Then, even when the grooves are clogged with the blast material, the number of blast material pieces transferred to a thermoplastic resin sheet becomes smaller so that defective transfer can be further prevented. Specifically, when the pitch interval between the recessed grooves is 100 µm or more, defective transfer can be prevented. When the pitch interval between the recessed grooves is 200 µm or more, defective transfer can be further prevented. When the pitch interval between the recessed grooves is 300 µm or more, defective transfer can be still further prevented. The upper limit of the pitch interval between the recessed grooves is not particularly limited, and is practically 10000 µm or less. For improvement of the deaeration properties and reduction of the optical distortion in production of laminated glass in a case where the thermoplastic resin sheet is used as an interlayer film for laminated glass, the upper limit of the pitch interval is preferably 600 µm or less, more preferably 400 µm or less, still more preferably 300 µm or less.

The axis angle of the recessed groove on the raw material roll surface is not particularly limited, and may be appropriately determined in accordance with the properties, such as self-adhesiveness, of the thermoplastic resin sheet.

FIG. 3 is a schematic view for explaining the groove height of a recessed portion, the width of a bottom portion, the pitch interval, the angle of inclination, and the axis angle of a recessed groove.

The groove height refers to a difference between the maximum height and the minimum height in a cross-section of a raw material roll in the direction perpendicular to the direction of grooves. The width of a bottom portion refers to a length of a region of the minimum height. The pitch interval refers to a distance between a bisector of the width of a bottom portion and a bisector of the width of an adjacent bottom portion. In a case where the bottom portion has no width, the pitch interval refers to a distance between a minimum height portion of a groove and a minimum height portion of an adjacent groove. The angle of inclination refers to an angle formed between a perpendicular of the roll axis and a slope from an end of a bottom portion to a projection (FIG. 3(b)).

The axis angle of a recessed groove refers to an intersection angle between a recessed groove on the surface of the raw material roll and the rotation axis of the roll (FIG. 3(a)).

The blast material used may be metallic particles made of cast iron, cast steel, or the like, or non-metallic particles made of silica sand, glass, garnet, silicon, aluminum oxide (alumina), or the like. The blast material used may be in the form of shots, grits, beads, cut wires, or the like. Particularly preferred is a blast material made of aluminum oxide in the form of grits.

The blast material is preferably a blast material with a grit size in a range of #240 to #1200, more preferably a blast material with a grit size in a range of #280 to #800 specified in the JIS standard (JIS R 6001-1998).

The conditions for spraying a blast material in the step of forming projections and recesses, the rotation speed of a raw material roll, or the like may be the same as those employed in a production method of an engraved roll by a common air blasting method. For example, a blast material may be sprayed using a nozzle with an aperture of 5 to 50 mm under the conditions of an air pressure of 1 to 12 kgf/cm$^2$, the number of passes of 1 to 5 times, a nozzle feed rate of 0.1 to 50 mm/rotation, and a rotation speed of a raw material roll at 1 to 40 m/min.

The nozzle may have a polygonal, perfect circle, or elliptical mouth, and preferably has a perfect circle mouth. The aperture of the nozzle refers to the maximum width of the nozzle mouth.

The blast material may be spouted out by direct pressure blasting, suction blasting, blasting by a blower, or the like. Preferred among these is direct pressure blasting.

In the step of forming projections and recesses, a blast material is sprayed at an angle of 20° or smaller relative to the line connecting the tip of a blast gun and the axis of a raw material roll. This enables efficient formation of an uneven pattern on the surface of a raw material roll. The angle is preferably 10° or smaller, more preferably 5° or smaller.

The method for producing an engraved roll of the present invention next includes a step of removing the blast material remaining in the recessed grooves by spraying the blast material at an angle of ±20° or smaller relative to the tangential plane direction of the roll and in a direction in parallel with the recessed grooves formed on the roll, while rotating the roll having the uneven pattern (FIGS. 2(a), 2(b)).

By spraying the blast material at an angle of ±20° or smaller relative to the tangential plane direction of the roll and in the direction in parallel with the recessed grooves in the pattern of projections and recessed formed on the roll, the blast material clogging the recessed grooves in the step of forming projections and recesses can be blown away to be removed. The angle is preferably ±10° or smaller, more preferably ±5° or smaller.

The conditions for spraying the blast material in the step of removing the blast material, the rotation speed of the raw material roll, or the like may be the same as those in the step of forming projections and recesses.

In the step of removing the blast materials, the blast material is sprayed at an angle of ±20° or smaller relative to the tangential plane direction of the roll and in the direction in parallel with the recessed grooves formed on the roll. This ensures removal of blast materials.

Alternatively, the blast material may also be removed by running a brush along the recessed grooves of the roll on which projections and recesses are formed. For more reliable removal of the blast material remaining in the recessed grooves, more preferred as the method employed in the step of removing the blast material is the method of spraying the blast material at an angle of ±20° or smaller relative to the tangential plane direction of the roll and in the direction in parallel with the recessed grooves formed on the roll.

Use of the engraved roll of the present invention can prevent occurrence of defective transfer to enable production of an embossed thermoplastic resin sheet in which the number of defects of the projections on the surface is significantly small.

The present invention also encompasses an embossed thermoplastic resin sheet having projections and recesses formed using the engraved roll of the present invention.

The embossed thermoplastic resin sheet of the present invention can be suitably used as an interlayer film for laminated glass.

The present invention also encompasses an interlayer film for laminated glass including the embossed thermoplastic resin sheet of the present invention.

In a case where the embossed thermoplastic resin sheet of the present invention is used as an interlayer film for laminated glass, examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. Preferred among these are polyvinyl acetal or ethylene-vinyl acetate copolymers, and more preferred is polyvinyl acetal.

The polyvinyl acetal can be produced by, for example, acetalization of a polyvinyl alcohol with an aldehyde. The polyvinyl alcohol can be produced by, for example, saponification of a polyvinyl acetate. The degree of saponification of the polyvinyl alcohol is usually in the range of 70 to 99.8 mol %.

The polyvinyl alcohol preferably has an average degree of polymerization of 200 or more, more preferably 500 or more, still more preferably 1700 or more, particularly preferably more than 1700, and preferably 5000 or less, more preferably 4000 or less, still more preferably 3000 or less, particularly preferably less than 3000. When the average degree of polymerization is equal to or more than the lower limit, the laminated glass has even higher penetration resistance. When the average degree of polymerization is equal to or lower than the upper limit, formation of the interlayer film is facilitated. The average degree of polymerization of the polyvinyl alcohol can be determined in accordance with JIS K6726 "Testing methods for polyvinyl alcohol".

The acetal group contained in the polyvinyl acetal may have any number of carbons. The polyvinyl acetal can be produced with any aldehyde. The lower limit of the carbon number of the acetal group in the polyvinyl acetal is preferably 3, and the upper limit thereof is preferably 6. When the acetal group in the polyvinyl acetal has a carbon number of 3 or greater, the interlayer film has a sufficiently low glass transition temperature. In addition, bleed-out of the plasticizer can be prevented. When the aldehyde has a carbon number of 6 or less, polyvinyl acetal can be easily synthesized, ensuring the productivity. The C3-C6 aldehyde may be a linear aldehyde or a branched aldehyde. Examples thereof include n-butylaldehyde and n-valeraldehyde The aldehyde is not limited. Commonly, a C1-C10 aldehyde is preferably used. Examples of such a C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. In particular, preferred are propionaldehyde, n-butyraldehyde, isobutyraldehyde, n-hexylaldehyde, and n-valeraldehyde. More preferred are propionaldehyde, n-butyraldehyde, and isobutyraldehyde. Still more preferred is n-butyraldehyde. These aldehydes may be used alone or in combination of two or more.

The polyvinyl acetal preferably has a hydroxy group content (amount of hydroxy groups) of 10 mol % or more, more preferably 15 mol % or more, still more preferably 18 mol % or more, and preferably 40 mol % or less, more preferably 35 mol % or less. When the hydroxy group content is equal to or more than the lower limit, the interlayer film has even higher adhesiveness. When the hydroxy group content is equal to or less than the upper limit, the interlayer film has high flexibility, making it easy to handle the interlayer film. The hydroxy group content of the polyvinyl acetal herein means a mole fraction expressed in percentage, determined by dividing the amount of ethylene groups to which hydroxy groups are bonded by the amount of all the ethylene groups in the main chain. The amount of ethylene groups to which hydroxy groups are bonded may be determined, for example, in accordance with JIS K6726 "Testing methods for polyvinyl alcohol" or ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has higher compatibility with a plasticizer. When the degree of acetylation is equal to or less than the upper limit, the interlayer film and the laminated glass have higher moisture resistance. The degree of acetylation herein means the mole fraction expressed in percentage, determined by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain. The amount of ethylene groups to which acetal groups are bonded can be determined, for example, in accordance with JIS K 6728 "Testing methods for polyvinyl butyral" or ASTM D1396-92.

The degree of acetalization of the polyvinyl acetal (degree of butyralization, in the case of the polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has higher compatibility with a plasticizer. When the degree of acetalization is equal to or less than the upper limit, the production of the polyvinyl acetal requires less reaction time. The degree of acetalization herein means the mole fraction expressed in percentage, determined by dividing the amount of ethylene groups to which acetal groups are bonded by the amount of all the ethylene groups in the main chain. The degree of acetalization can be calculated by measuring the degree of acetylation and the hydroxy group content in accordance with JIS K6728 "Testing methods for polyvinyl butyral" or ASTM D1396-92, calculating the mole fraction from the measurements, and then subtracting the degree of acetylation and the hydroxy group content from 100 mol %.

The hydroxy group content (amount of hydroxy groups), the degree of acetalization (degree of butyralization), and the degree of acetylation are preferably calculated based on the results of the measurement by a method in conformity with JIS K6728 "Testing methods for polyvinyl butyral". In a case where polyvinyl acetal is a polyvinyl butyral resin, the hydroxy group content (amount of hydroxy groups), degree of acetalization (degree of butyralization), and the degree of acetylation are preferably calculated based on the results of the measurement by a method in conformity with JIS K6728 "Testing methods for polyvinyl butyral".

The interlayer film for laminated glass of the present invention preferably contains a plasticizer.

Any plasticizer commonly used for an interlayer film for laminated glass can be used. Examples thereof include organic plasticizers such as monobasic organic acid esters or polybasic organic acid esters, and phosphoric acid plasticizers such as organophosphate compounds or organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethyl butyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the interlayer film preferably contains triethylene glycol-di-2-ethylhexanoate, triethylene glycol-di-2-ethylbutyrate, or triethylene glycol-di-n-heptanoate, more preferably contains triethylene glycol-di-2-ethylhexanoate.

The amount of the plasticizer is not limited. The amount of the plasticizer based on 100 parts by mass of the thermoplastic resin is preferably 25 parts by mass or more, more preferably 30 parts by mass or more, and preferably 80 parts by mass or less, more preferably 70 parts by mass or less. When the plasticizer content is equal to or more than the lower limit, the laminated glass can have even higher penetration resistance. When the plasticizer content is equal to or lower than the upper limit, the interlayer film has even higher transparency.

The interlayer film for laminated glass of the present invention preferably contains an adhesion modifier.

The adhesion modifier is preferably, for example, an alkali metal salt or an alkaline earth metal salt. Examples of the adhesion modifier include salts such as potassium, sodium, or magnesium salt. Examples of the acid constituting the salts include carboxylic organic acids such as octylic acid, hexylic acid, 2-ethylbutyric acid, butyric acid, acetic acid, and formic acid and inorganic acids such as hydrochloric acid and nitric acid. Preferred among these is magnesium salt because adhesiveness between glass and the interlayer film for laminated glass can be easily adjusted.

In a case where the interlayer film for laminated glass of the present invention includes a laminate of two or more resin layers, the adhesion modifier is preferably contained at least in a resin layer that is to be in contact with glass.

The interlayer film for laminated glass of the present invention may optionally contain additives such as an antioxidant, a light stabilizer, modified silicone oil as an adhesion modifier, a flame retardant, an antistatic agent, a moisture-proof agent, a heat reflecting agent, or a heat absorbing agent.

The interlayer film for laminated glass of the present invention includes at least a first resin layer and a second resin layer as two or more resin layers. The hydroxy group content of polyvinyl acetal (hereafter, referred to as polyvinyl acetal A) in the first resin layer is preferably different from the hydroxy group content of polyvinyl acetal (hereafter, referred to as polyvinyl acetal B) in the second resin layer. Since the polyvinyl acetal A and the polyvinyl acetal B have different properties, various properties that cannot be achieved by a monolayer structure can be imparted to the interlayer film for laminated glass. For example, in a case where the first resin layer is interposed between two second resin layers and the hydroxy group content of the polyvinyl acetal A is smaller than the hydroxy group content of the polyvinyl acetal B, the first resin layer tends to have a lower glass transition temperature than the second resin layer. As a result, the first resin layer is softer than the second resin layer, so that the interlayer film for laminated glass has better sound-insulating properties. For another example, in a case where the first resin layer is interposed between two second resin layers and the hydroxy group content of the polyvinyl acetal A is greater than the hydroxy group content of the polyvinyl acetal B, the first resin layer tends to have a higher glass transition temperature than the second resin layer. As a result, the first resin layer is harder than the second resin layer, so that the interlayer film for laminated glass has better penetration resistance.

Moreover, in a case where the first resin layer and the second resin layer contain a plasticizer, the plasticizer content (hereafter, referred to as content A) in the first resin layer based on 100 parts by mass of polyvinyl acetal is preferably different from the plasticizer content (hereafter, referred to as content B) in the second resin layer based on 100 parts by mass of polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, so that the interlayer film for laminated glass has better sound-insulating properties. In a case where the first resin layer is interposed between two second resin layers and the content A is smaller than the content B, the first resin layer tends to have a higher glass transition temperature than the second resin layer. As a result, the first resin layer is harder than the second resin layer, so that the interlayer film for laminated glass has better penetration resistance.

An exemplary combination of two or more resin layers included in the interlayer film for laminated glass of the present invention includes a sound insulation layer as the first resin layer and a protective layer as the second resin layer with an aim of improving the sound-insulating properties of the laminated glass. Preferably, the sound insulation layer contains polyvinyl acetal X and a plasticizer and the protective layer contains polyvinyl acetal Y and a plasticizer because the laminated glass can have better sound-insulating properties. Moreover, in a case where the sound insulation layer is interposed between two protective layers, an interlayer film for laminated glass excellent in sound-insulating properties (hereafter, also referred to as a sound-insulating interlayer film) can be obtained. Hereafter, a sound-insulating interlayer film is more specifically described.

In the sound-insulating interlayer film, the sound insulation layer has a function of imparting sound-insulating properties. The sound insulation layer preferably contains polyvinyl acetal X and a plasticizer. The polyvinyl acetal X can be prepared by acetalization of polyvinyl alcohol with an aldehyde. Commonly, the polyvinyl alcohol can be obtained by saponification of polyvinyl acetate. The lower limit of the average degree of polymerization of the polyvinyl alcohol is preferably 200, whereas the upper limit thereof is preferably 5000. When the average degree of polymerization of the polyvinyl alcohol is 200 or higher, the penetration resistance of the sound-insulating interlayer film to be obtained can be improved. When the average degree of polymerization of the polyvinyl alcohol is 5000 or lower, formability of the sound insulation layer can be ensured. The lower limit of the average degree of polymerization of the polyvinyl alcohol is more preferably 500, whereas the upper limit thereof is more preferably 4000. The average degree of polymerization of the polyvinyl alcohol is determined in accordance with JIS K6726 "Testing methods for polyvinyl alcohol".

The lower limit of the carbon number of an aldehyde used for acetalization of the polyvinyl alcohol is preferably 4, whereas the upper limit thereof is preferably 6. When the carbon number of the aldehyde is 4 or more, the sound insulation layer can stably contain a sufficient amount of a plasticizer to exhibit excellent sound-insulating properties. Moreover, bleed-out of the plasticizer can be prevented. When the carbon number of the aldehyde is 6 or less, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain the plasticizer in an amount needed for exhibiting sound-insulating properties, and bleed-out of the plasticizer can be prevented. The upper limit of the hydroxy group content of the polyvinyl acetal X is more preferably 28 mol %, still more preferably 26 mol %, particularly preferably 24 mol %, whereas the lower limit thereof is preferably 10 mol %, more preferably 15 mol %, still more preferably 20 mol %. The hydroxy group content of the polyvinyl acetal X is a value in percentage (mol %) of the mole fraction obtained by dividing the amount of ethylene groups to which hydroxy groups are bonded by the amount of all the ethylene groups in the main chain. The amount of ethylene groups to which hydroxy groups are bonded can be obtained by measuring the amount of ethylene groups to which hydroxy groups are bonded in the polyvinyl acetal X in accordance with JIS K6728 "Testing methods for polyvinyl butyral".

The lower limit of the acetal group content of the polyvinyl acetal X is preferably 60 mol %, whereas the upper limit thereof is preferably 85 mol %. When the acetal group content of the polyvinyl acetal X is 60 mol % or more, the sound insulation layer has higher hydrophobicity and can contain a plasticizer in an amount needed for exhibiting sound-insulating properties, and bleed-out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol %. The acetal group content can be obtained by measuring the amount of ethylene groups to which acetal groups are bonded in the polyvinyl acetal X in accordance with JIS K6728 "Testing methods for polyvinyl butyral".

The lower limit of the acetyl group content of the polyvinyl acetal X is preferably 0.1 mol %, whereas the upper limit thereof is preferably 30 mol %. When the acetyl group content of the polyvinyl acetal X is 0.1 mol % or more, the sound insulation layer can contain a plasticizer in an amount needed for exhibiting sound-insulating properties, and bleed-out can be prevented. When the acetyl group content of the polyvinyl acetal X is 30 mol % or less, the sound insulation layer has higher hydrophobicity to prevent whitening. The lower limit of the acetyl group content is more preferably 1 mol %, still more preferably 5 mol %, particularly preferably 8 mol %, whereas the upper limit thereof is more preferably 25 mol %, still more preferably 20 mol %. The acetyl group content is a value in percentage (mol %) of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

In particular, the polyvinyl acetal X is preferably polyvinyl acetal with the acetyl group content of 8 mol % or more or polyvinyl acetal with the acetyl group content of less than 8 mol % and the acetal group content of 65 mol % or more because the sound insulation layer can easily contain a plasticizer in an amount needed for exhibiting sound-insulating properties. The polyvinyl acetal X is more preferably polyvinyl acetal having an acetyl group content of 8 mol % or more or polyvinyl acetal having an acetyl group content of less than 8 mol % and an acetal group content of 68 mol % or more.

The lower limit of the plasticizer content of the sound insulation layer is preferably 45 parts by mass, whereas the upper limit thereof is preferably 80 parts by mass based on 100 parts by mass of the polyvinyl acetal X. When the plasticizer content is 45 parts by mass or more, high sound-insulating properties can be exhibited. When the plasticizer content is 80 parts by mass or less, bleed-out of the plasticizer is prevented, so that the transparency or adhesiveness of the interlayer film for laminated glass is not lowered. The lower limit of the plasticizer content is more preferably 50 parts by mass, still more preferably 55 parts by mass, whereas the upper limit thereof is more preferably 75 parts by mass, still more preferably 70 parts by mass.

The lower limit of the thickness of the sound insulation layer is preferably 50 μm. When the thickness of the sound insulation layer is 50 μm or more, sufficient sound-insulating properties can be exhibited. The lower limit of the thickness of the sound insulation layer is more preferably 80 μm. The upper limit thereof is not particularly limited, and is preferably 300 μm in consideration of the thickness as an interlayer film for laminated glass.

The protective layer has a function of preventing bleed-out of a large amount of a plasticizer contained in the sound insulation layer to prevent lowering of the adhesiveness between the interlayer film for laminated glass and glass and imparting penetration resistance to the interlayer film for laminated glass. The protective layer preferably contains, for example, polyvinyl acetal Y and a plasticizer, more preferably polyvinyl acetal Y with a greater hydroxy group content than the polyvinyl acetal X and a plasticizer.

The polyvinyl acetal Y can be prepared by acetalization of polyvinyl alcohol with an aldehyde. The polyvinyl alcohol can be commonly obtained by saponification of polyvinyl acetate. The lower limit of the average degree of polymerization of the polyvinyl alcohol is preferably 200, whereas the upper limit thereof is preferably 5000. When the average degree of polymerization of the polyvinyl alcohol is 200 or more, the penetration resistance of the interlayer film for laminated glass can be improved. When the average degree of polymerization of the polyvinyl alcohol is 5000 or less, the formability of the protective layer can be ensured. The lower limit of the average degree of polymerization of the polyvinyl alcohol is more preferably 500, whereas the upper limit thereof is more preferably 4000.

The lower limit of the carbon number of an aldehyde used for acetalization of the polyvinyl alcohol is preferably 3, whereas the upper limit thereof is preferably 4. When the carbon number of the aldehyde is 3 or more, the penetration resistance of the interlayer film for laminated glass is improved. When the carbon number of the aldehyde is 4 or less, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol %, whereas the lower limit thereof is preferably 28 mol %. When the hydroxy group content of the polyvinyl acetal Y is 33 mol % or less, whitening of the interlayer film for laminated glass can be prevented. When the hydroxy group content of the polyvinyl acetal Y is 28 mol % or more, the penetration resistance of the interlayer film for laminated glass can be improved.

The lower limit of the acetal group content of the polyvinyl acetal Y is preferably 60 mol %, whereas the upper limit thereof is preferably 80 mol %. When the acetal group content is 60 mol % or more, the protective layer can contain a plasticizer in an amount needed for exhibiting sufficient penetration resistance. When the acetal group content is 80 mol % or less, the adhesiveness between the protective layer and glass can be ensured. The lower limit of the acetal group content is more preferably 65 mol %, whereas the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the protective layer has higher hydrophobicity, thereby preventing whitening. The upper limit of the acetyl group content is more preferably 2 mol %, whereas the lower limit thereof is preferably 0.1 mol %. The hydroxy group contents, acetal group contents, and acetyl group contents of the polyvinyl acetal A, B, and Y can be measured by the same method as in the case of the polyvinyl acetal X.

The lower limit of the plasticizer content of the protective layer is preferably 20 parts by mass, whereas the upper limit thereof is preferably 45 parts by mass based on 100 parts by mass of the polyvinyl acetal Y. When the plasticizer content is 20 parts by mass or more, the penetration resistance can be ensured. When the plasticizer content is 45 parts by mass or less, bleed-out of the plasticizer can be prevented, so that the transparency and adhesiveness of the interlayer film for laminated glass is not lowered. The lower limit of the plasticizer content is more preferably 30 parts by mass, still more preferably 35 parts by mass, whereas the upper limit thereof is more preferably 43 parts by mass, still more preferably 41 parts by mass. The plasticizer content of the protective layer is preferably smaller than the plasticizer content of the sound insulation layer because sound-insulating properties can be further improved in the laminated glass.

The hydroxy group content of the polyvinyl acetal Y is preferably greater than the hydroxy group content of the polyvinyl acetal X, more preferably greater by 1 mol % or more, still more preferably greater by 5 mol % or more, particularly preferably greater by 8 mol % or more because the sound-insulating properties of the laminated glass is further improved. Adjustment of the hydroxy group contents of the polyvinyl acetal X and the polyvinyl acetal Y allows control of the plasticizer contents in the sound insulation layer and the protective layer, lowering the glass transition temperature of the sound insulation layer. As a result, the sound-insulating properties of the laminated glass are further improved. The plasticizer content (hereafter, also referred to as content X) based on 100 parts by mass of the polyvinyl acetal X in the sound insulation layer is preferably greater than the plasticizer content (hereafter, also referred to as content Y) based on 100 parts by mass of the polyvinyl acetal Y in the protective layer, more preferably greater by 5 parts by mass or more, still more preferably greater by 15 parts by mass or more, particularly preferably greater by 20 parts by mass or more because the sound-insulating properties of the laminated glass is still further improved. Adjustment of the content X and the content Y lowers the glass transition temperature of the sound insulation layer. As a result, the sound-insulating properties of the laminated glass are still further improved.

The thickness of the protective layer is not limited as long as it is adjusted within the range that allows the layer to serve as a protective layer. When the protective layer has projections and recesses, the protective layer is preferably as thick as possible in order to prevent transfer of the projections and recesses into the interface between the protective layer and the sound insulation layer directly in contact with the protective layer. Specifically, the lower limit of the thickness of the protective layer is preferably 100 μm, more preferably 300 μm, still more preferably 400 μm, particularly preferably 450 μm. The upper limit of the thickness of the protective layer is not limited. In order to ensure the thickness enough to achieve sufficient sound insulation properties, the upper limit is practically about 500 μm.

The sound insulating interlayer film may be produced by any method. For example, sheets of the sound insulation layer and the protective layer are formed by a usual sheet formation method such as an extrusion method, a calender method, or a press method, and then these sheets are laminated.

The present invention also encompasses a laminated glass including the interlayer film for laminated glass of the present invention interposed between a pair of glass sheets.

The glass sheets may be commonly used transparent plate glass. Examples thereof include inorganic glass such as float plate glass, polished plate glass, molded plate glass, wired glass, wire-reinforced plate glass, colored plate glass, heat ray-absorbing glass, heat ray-reflecting glass, and green glass. UV-shielding glass with a UV-shielding coating layer on the surface may also be used. Further, organic plastic sheets such as polyethylene terephthalate, polycarbonate, and polyacrylate sheets may also be used.

Two or more different glass sheets may be used as the glass sheets. For example, the interlayer film for laminated glass of the present invention may be interposed between a transparent float plate glass and a colored plate glass such as green glass to produce laminated glass. Two or more glass sheets different in thickness may be used as the glass sheets.

Advantageous Effects of Invention

The present invention can provide an embossed thermoplastic resin sheet that is capable of enhancing deaeration during production of laminated glass and suppressing optical distortion of the resulting laminated glass to improve the visibility when used as an interlayer film for laminated glass, an engraved roll used for production of the embossed thermoplastic resin sheet, a production method of the engraved roll, an interlayer film for laminated glass including the embossed thermoplastic resin sheet, and a laminated glass.

DESCRIPTION OF EMBODIMENTS

Figure 1:
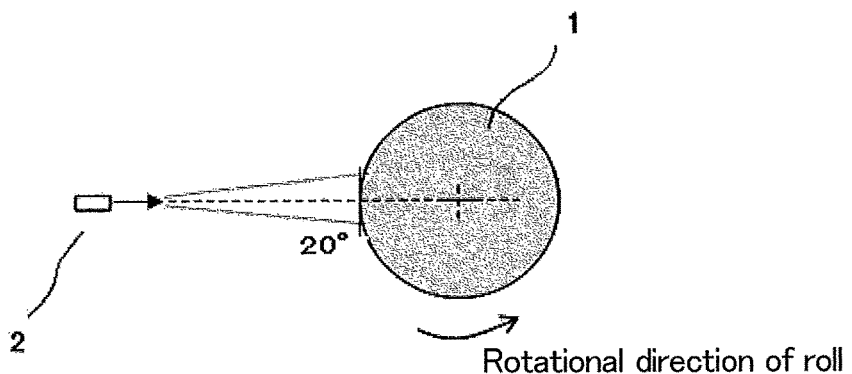
FIG. 1 is a schematic view for explaining the step of forming projections and recesses in the method for producing an engraved roll of the present invention.
Figure 1:
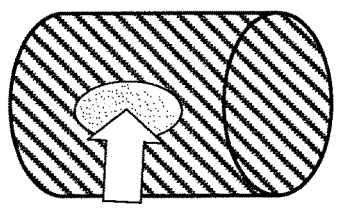
Figure 2:
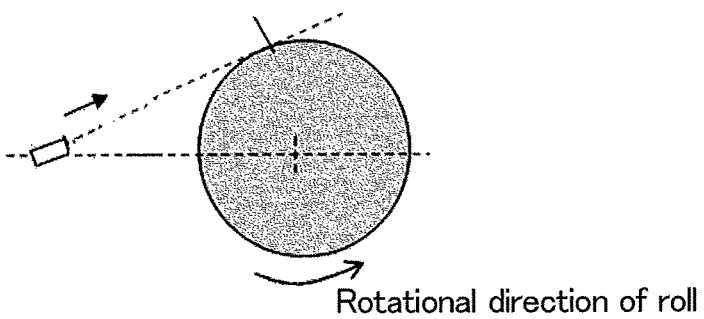
FIG. 2 is a schematic view for explaining the step of removing the blast material in the method for producing an engraved roll of the present invention.
Figure 2:
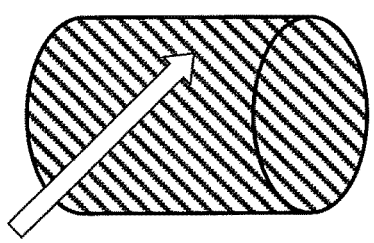
Figure 3:
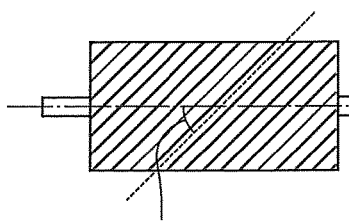
FIG. 3 is a schematic view for explaining the groove height, the width of a bottom portion, the pitch interval and the angle of inclination of a recessed portion.
Figure 3:
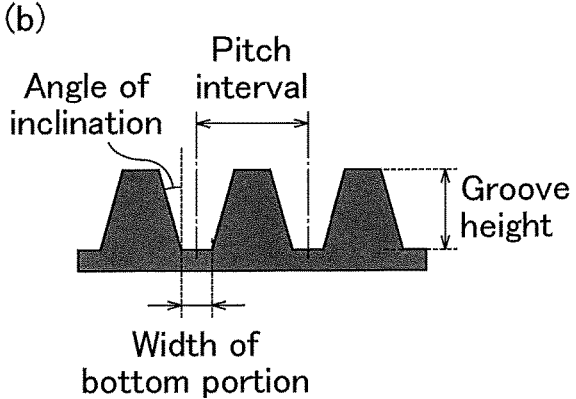

Embodiments of the present invention are more specifically described in the following with reference to, but not limited to, examples.

Example 1

(1) Preparation of Raw Material Roll

A mirror-finished chilled iron roll (diameter: 600 mm) was prepared, and milled in the circumferential direction for formation of a large number of recessed grooves and projected ridges on the surface, while being rotated. A raw material roll was thus prepared. In the milled pattern of projections and recesses on the raw material roll, the groove height was 250 µm, the width of a bottom portion was 0 µm, the pitch interval was 300 µm, the angle of inclination was 15°, and the axis angle of a recessed groove was 85°.

(2) Production of Engraved Roll

The blast material used was alumina #250 (corresponding to #280 according to the JIS standard (JIS R 6001-1998)). The blast material was sprayed to the raw material roll at an angle of 0° relative to the line connecting the tip of a blast gun and the axis of the raw material roll, while the raw material roll was rotated. In this manner, an uneven pattern was formed on the surface of the raw material roll (Step of forming projections and recesses).

The blast material was sprayed under the conditions of an air pressure of 2.5 kgf/cm², a nozzle aperture of 8 mm, and a rotation speed of the raw material roll of 30 m/min, while the blast gun was moved from one end to the other end of the roll at a moving speed of 2 mm per rotation of the raw material roll.

Then, the blast material was sprayed to the roll having the uneven pattern at an angle of 0° relative to the tangential plane direction of the roll and in a direction in parallel with the recessed grooves of the roll, while the roll is rotated, for removal of the blast material remaining in the recessed grooves. In this manner, an engraved roll was obtained (Step of removing blast materials).

(3) Production of Embossed Thermoplastic Resin Sheet

Polyvinyl alcohol having an average degree of polymerization of 1700 was acetalized with n-butylaldehyde to prepare polyvinyl butyral (acetyl group content: 1 mol %, butyral group content: 69 mol %, hydroxy group content: 30 mol %). To 100 parts by mass of the polyvinyl butyral were added 40 parts by mass of triethyleneglycol-di-2-ethylhexanoate (3GO) as a plasticizer. The mixture was sufficiently kneaded with a mixing roll to prepare a resin composition. The obtained resin composition was extruded through an extruder to give a thermoplastic resin sheet with a thickness of 760 µm.

A pair of rolls including the obtained engraved roll and a rubber roll having a JIS hardness of 70 to 90 was used as a device for transferring an uneven pattern. The obtained thermoplastic resin sheet was passed through the device for transferring an uneven pattern, whereby projections and recesses were transferred to one surface of the sheet. The transfer conditions employed here were a temperature of the thermoplastic resin sheet of 70° C., a temperature of the rolls of 140° C., a linear velocity of 10 m/min, and a linear pressure of 1 to 300 kN/m. Subsequently, the same treatment was performed to transfer projections and recesses to the other surface of the sheet under the same conditions.

Examples 2 to 9

Engraved rolls were produced under the same conditions for spraying the blast material and through the same step for removing the blast material as those in Example 1, except that the raw material roll used in "(2) Production of engraved roll" and the angle for spraying the blast material relative to the tangential plane in the step of removing the blast material were changed as shown in Tables 1 and 2. Then, embossed thermoplastic resin sheets were produced. In Examples 8 and 9, however, only the step of forming projections and recesses was performed and the step of removing the blast material was not performed.

Comparative Example 1, 2

Engraved rolls were produced under the same conditions for spraying the blast material as those in Example 1, except that the raw material roll used in "(2) Production of engraved roll" was changed as shown in Table 2 and that the step of removing the blast material was not performed. Then embossed thermoplastic resin sheets were produced.

Example 10

(Production of Embossed Multilayer Thermoplastic Resin Sheet)
(1) Preparation of Resin Composition for Forming First Resin Layer (Sound Insulation Layer)

Polyvinyl alcohol having an average degree of polymerization of 2400 was acetalized with n-butyraldehyde to prepare polyvinyl butyral (acetyl group content: 12 mol %, butyral group content: 66 mol %, hydroxy group content: 22 mol %). To 100 parts by mass of the polyvinyl butyral were added 60 parts by mass of triethylene glycol-di-2-ethylhexanoate (3GO) as a plasticizer. The mixture was sufficiently kneaded with a mixing roll. Thus, a resin composition for forming a first resin layer (sound insulation layer) was prepared.

(2) Preparation of Resin Composition for Forming Second Resin Layer (Protective Layer)

Polyvinyl alcohol having an average degree of polymerization of 1700 was acetalized with n-butyraldehyde to prepare polyvinyl butyral (acetyl group content: 1 mol %, butyral group content: 69 mol %, hydroxy group content: 30 mol %). To 100 parts by mass of the polyvinyl butyral were added 40 parts by mass of triethylene glycol-di-2-ethylhexanoate (3GO) as a plasticizer. The mixture was sufficiently kneaded with a mixing roll. Thus, a resin composition for forming a second resin layer (protective layer) was prepared.

(3) Preparation of Interlayer Film for Laminated Glass

The resin composition for forming a first resin layer (sound insulation layer) and the resin composition for forming a second resin layer (protective layer) were co-extruded through a co-extruder to produce a multilayer thermoplastic resin sheet (thickness: 0.8 mm) in which a first resin layer (sound insulation layer) was interposed between two second resin layers (protective layers). The first resin layer had a thickness of 0.1 mm, and the second resin layers each had a thickness of 0.35 mm. Hereafter, the three layers may be called a second resin layer A, the first resin layer, and a second resin layer B in the order of lamination in the thickness direction for identification of two second resin layers.

A pair of rolls including the engraved roll obtained in Example 1 and a rubber roll having a JIS hardness of 70 to 90 was used as a device for transferring an uneven pattern. The obtained multilayer thermoplastic resin sheet was passed through the device for transferring an uneven pattern, whereby projections and recesses were transferred to one surface of the sheet. The transferring conditions employed here were a temperature of the thermoplastic resin sheet of 70° C., a temperature of the rolls of 140° C., a linear velocity of 10 m/min, and a linear pressure of 1 to 300 kN/m. Subsequently, the same treatment was performed to transfer projections and recesses to the other surface of the sheet under the same conditions.

Examples 11 to 22

Engraved rolls were produced under the same conditions for spraying the blast material and through the same step for removing the blast material as those in Example 10, except that the composition of polyvinyl butyral used in the first resin layer and the second resin layer, the raw material roll used in "(2) Production of engraved roll", and the angle for spraying the blast material relative to the tangential plane in the step of removing the blast material were changed as shown in Tables 3 to 5. Then, embossed thermoplastic resin sheets were produced. In Examples 17 and 18, however, only the step of forming projections and recesses was performed and the step of removing the blast material was not performed.

Comparative Example 3, 4

Engraved rolls were produced under the same conditions for spraying the blast material as those in Example 10, except that the raw material roll used in "(2) Production of engraved roll" was changed as shown in Table 4 and that the step of removing the blast material was not performed. Then, embossed thermoplastic resin sheets were produced.

(Evaluation)

The engraved rolls and the embossed thermoplastic resin sheets obtained in the examples and the comparative examples were evaluated by the following methods.

Tables 1 to 5 show the results.

(1) Measurement of the Number of Blast Material Pieces Present in Recessed Grooves of Engraved Roll The recessed groove portion of each engraved roll were photographed at a 200× magnification with a microscope ("Dino-Lite Pro2, model: DILITE80" produced by AnMo Electronics corporation). The number of remaining blast material pieces with a maximum length of 10 µm or larger present in a range of 1290 µm×1024 µm in the obtained photograph was counted. The number of remaining blast material pieces was similarly counted at 10 points on each of the positions at ¼, 2/4, and ¾ of the obtained engraved roll from both ends in the width direction in such a manner that each field of view does not overlap with each other. The arithmetic mean of the obtained values was taken as the average number of the blast material pieces in the recessed grooves of the engraved roll.

The number of blast material pieces was counted after the step of forming projections and recesses and after the step of removing blast materials. In Examples 8, 9, 17, and 18 and Comparative Examples 1 to 4, counting of the number of the blast material pieces after the step of removing the blast material was omitted because the step of removing blast material pieces was not performed and the number of the blast material pieces was not changed.

Figure 4:
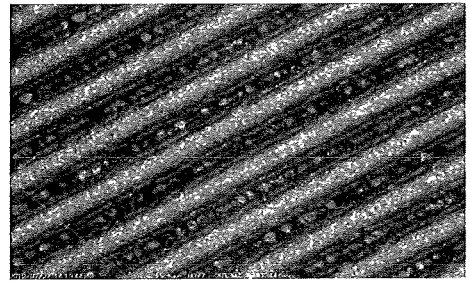
FIG. 4 shows a photo (a) of a recessed groove portion of an engraved roll photographed after the step of forming projections and recesses in Example 1 and a photo (b) of a recessed groove portion of the engraved roll photographed after the step of removing the blast material in Example 1.
Figure 4:
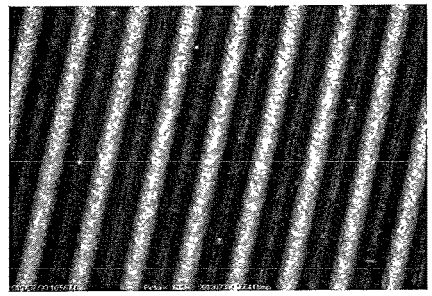

FIG. 4(a) is a photograph of a recessed groove portion of the engraved roll after the step of forming projections and recesses in Example 1. FIG. 4(b) is a photograph of the recessed groove portion of the engraved roll after the step of removing the blast material in Example 1.

(2) Evaluation of Pattern of Projections and Recesses on Embossed Thermoplastic Resin Sheet The surface roughness of the embossed thermoplastic resin sheet in a field of view of 5 mm×5 mm was measured with a three-dimensional profilometer ("KS-1100" produced by KEYENCE CORPORATION, head: model "LT-9510VM") for evaluation of the projections and recesses on the embossed thermoplastic resin sheet. In the obtained image data, Ra of the apex portions of the projections and height difference r were measured in a direction in parallel with the projections. The number of portions where r is higher than Ra by 30 µm or more was counted as defects. Here, Ra refers to the arithmetic mean roughness Ra specified in JIS B-0601 (1994). Ra is a value calculated using "KS-Analyzer Ver. 2.00", analysis software included with the three-dimensional profilometer, in the line roughness measurement mode based on the roughness profile data obtained by drawing a measuring line from one end to the other end of the field of view in a direction in parallel with the direction in which the apex portions of the projections are continuous. The height difference r is determined as follows. The obtained roughness profile is divided at 500-µm intervals into plural sections starting from the upper side or the left side of the field of view with which an apex portion of a projection is in contact. The difference between the maximum height and the minimum height in each section is taken as the height difference r. The height difference of all the projections present in the field of view is determined by the same method. The correction conditions employed for obtaining the roughness profile data are cut-off value of 2.5 mm, no height smoothing, no tilt correction, and automatic range setting. The measurement conditions other than the field of view are as follows: stage feed condition: continuous; scan direction: bi-directional scanning; leading axis: X-axis; stage travel rate: 250.0 µm/s; axis feed rate: 10000.0 µm/s; measuring pitch of X axis: 2.0 µm; and measuring pitch of Y axis: 2.0 µm. The arithmetic mean is obtained by counting the number of defects at four points at each of the positions of ¼, ²⁄₄, and ¾ of a roll of the resulting thermoplastic resin sheet from both ends in the width direction. The obtained value was taken as the number of defects of the projections.

Figure 5:
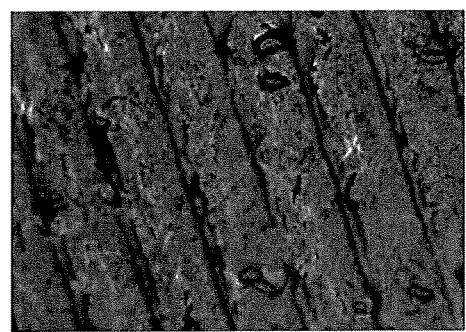
FIG. 5 shows a photo (a) of projections and recesses of an embossed thermoplastic resin sheet obtained in Example 1 and a photo (b) of projections and recesses of an embossed thermoplastic resin sheet obtained in Comparative Example 1.
Figure 5:
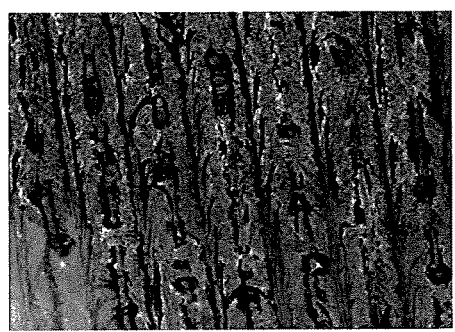

FIG. 5(a) is a photograph of projections and recesses of the embossed thermoplastic resin sheet obtained in Example 1. FIG. 5(b) is a photograph of projections and recesses of the embossed thermoplastic resin sheet obtained in Comparative Example 1.

Figure 6:
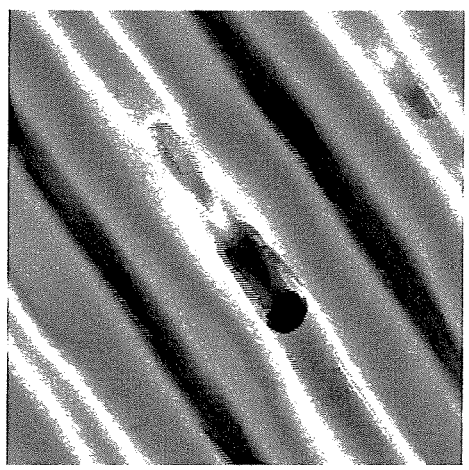
FIG. 6 is an exemplary image data of an embossed thermoplastic resin sheet by a three-dimensional profilometer.
Figure 6:
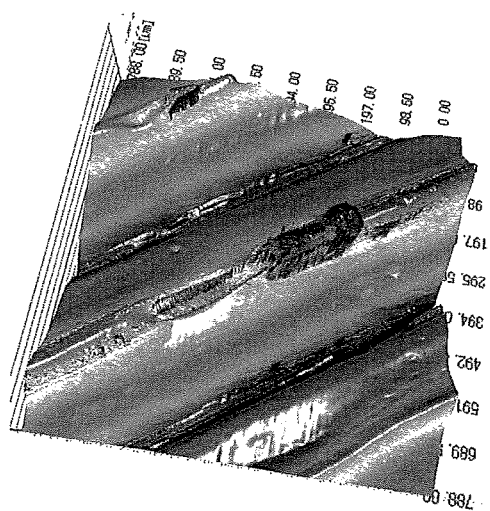

FIG. 6 shows exemplary image data of embossed thermoplastic resin sheet created by the three-dimensional profilometer.

The roughness (Rz) of the recesses in the shape of engraved lines on one surface of the obtained embossed thermoplastic resin sheet was measured by a method in conformity with JIS B-0601(1994). The measurement may be performed in a direction perpendicular to the engraved lines at a cut-off value of 2.5 mm, a standard length of 2.5 mm, a measurement length of 12.5 mm, a tip radius of a stylus of 2 µm, a tip angle of 60°, and a measurement rate of 0.5 mm/s. The roughness on the other surface on the opposite side of the above surface was the same, and therefore, Tables 1 to 5 only show the values of Rz on one surface.

(3) Evaluation of Deaeration Properties

The obtained embossed thermoplastic resin sheet was used as an interlayer film for laminated glass, and a laminated glass was produced by preliminary pressure bonding through deaeration under reduced pressure, followed by final pressure bonding, as described below.

(Preliminary Pressure Bonding)

The interlayer film for laminated glass was sandwiched between two clear glass sheets (30 cm in length×30 cm in width×2.5 mm in thickness), and a portion protruding therefrom was cut, thereby preparing a laminate. The obtained laminate was placed in a rubber bag, which was connected to a vacuum suction device. The rubber bag was held under a reduced pressure of −60 kPa (absolute pressure of 16 kPa) for 10 minutes with heating so that the temperature (preliminary pressure bonding temperature) of the laminate reached 70° C. Thereafter, the pressure was returned to atmospheric pressure, whereby completing the preliminary pressure bonding. The preliminary pressure bonding was performed under three different conditions of a deaeration start temperature of 40° C., 50° C., and 60° C.

(Final Pressure Bonding)

The laminate after the preliminary pressure bonding was placed in an autoclave and held at a temperature of 140° C. and a pressure of 1300 kPa for 10 minutes. Then, the temperature was lowered to 50° C. and the pressure was returned to atmospheric pressure, whereby the final pressure bonding was completed. A laminated glass was thus prepared.

(Bake Test of Laminated Glass)

The obtained laminated glass was heated in an oven at 140° C. for two hours. The resulting laminated glass was taken out from the oven and cooled for three hours. The appearance of the laminated glass was visually observed to check the number of the laminated glass sheets in which foaming (bubbles) occurred for evaluation of deaeration properties. Twenty sheets were tested for each laminated glass.

The case where the number of glass sheets in which foaming occurred was 5 or less among 20 sheets under any of the deaeration start temperature conditions was rated "○ (good)". The case where the number of glass sheets in which foaming occurred was more than 5 among 20 sheets under any one of the deaeration start temperature conditions was rated "× (poor)".

(4) Evaluation of Optical Distortion (Visual Evaluation)

A laminated glass was produced in the same manner as in the case of the evaluation of deaeration properties.

A fluorescent lamp (produced by Panasonic Corporation, FL32S.D) was set at a point of 7 m distant from an observer. The laminated glass was set at a point of 40 cm distant from the observer on the line connecting the fluorescent lamp and the observer in such a manner that the laminated glass was inclined 45° relative to the horizontal plane. The case where the fluorescent lamp seen through the laminated glass was distorted was rated "× (poor)", and the case where the fluorescent lamp seen through the laminated glass was not distorted was rated "○ (good)". The optical distortion was evaluated at 25° C.

(5) Evaluation of Optical Distortion Value

A laminated glass was produced in the same manner as in the case of evaluation of deaeration properties.

The optical distortion value was measured with an optical distortion inspecting device disclosed in JP-A H07-306152. The optical distortion inspecting device includes: a light source unit which emits illumination light toward a light-transmitting object to be inspected; a projection plane where the illumination light having passed through the object to be inspected is projected; an image inputting section for generating a gradation image by capturing the projection plane; and an image processing section for determining the presence or absence of distortion based on the variation in the gradation level of the gradation image generated by the image inputting section. Specifically, upon evaluation of the optical distortion by using EYE DICHO-COOL HALOGEN (15V100W) produced by Iwasaki Electric Co., Ltd. as a light source, the illuminance of the light source, the angle of a screen where an optical distortion image is to be projected, and the angle of a camera were adjusted in such a manner that a laminated glass including a single layer film having a visible light transmittance in conformity with JIS R3211 (1988) (value for Y under standard illuminant A, A-Y (380 to 780 nm)) of 88% ("U4100" produced by Hitachi High-Technologies Corporation was used) had an optical distortion value of 1.14 and that the optical distortion value in a state of including no glass was adjusted to 1.30. The optical distortion was evaluated under the condition of the laminated glass temperature of 25° C. As the optical distortion values, values in the lengthwise direction and in the width direction can be calculated. In the present case, the smaller value of the two was employed as the optical distortion value. The thermometer used was a contact-type thermometer.

TABLE 1

|  |  | Example 1 | Example 2 | Example 3 | Example 4 | Example 5 | Example 6 |
|---|---|---|---|---|---|---|---|
| Shape of recessed grooves of raw material roll | Groove height (μm) | 250 | 330 | 250 | 250 | 250 | 80 |
|  | Width of bottom portion (μm) | 0 | 15 | 40 | 40 | 40 | 5 |
|  | Pitch interval (μm) | 300 | 200 | 400 | 400 | 400 | 220 |
|  | Angle of inclination (°) | 15 | 15 | 15 | 15 | 15 | 15 |
|  | Roll diameter (mm) | 600 | 600 | 600 | 600 | 600 | 600 |
|  | Axis angle of recessed groove (°) | 85 | 85 | 85 | 85 | 85 | 85 |
| Step of removing blast material | Spraying angle relative to tangential plane of roll (°) | 0 | 0 | 0 | 15 | 10 | 10 |
| Number of blast material pieces in recessed grooves of engraved roll (pcs/mm²) | After step of forming projections and recesses | 80 | 100 or more | 60 | 60 | 60 | 100 or more |
|  | After step of removing blast material | 0.30 | 0.71 | 0.20 | 2.75 | 1.45 | 2.83 |
| Number of defective projections or recesses on embossed thermoplastic resin sheet (pcs/mm²) |  | 0.04 | 0.08 | 0.02 | 0.25 | 0.15 | 0.77 |
| Roughness of embossment at apex portion | Ra (μm) | 3.5 | 4.3 | 4.5 | 3.5 | 3 | 2.5 |
| Roughness of embossment | Rz (μm) | 38 | 33 | 35 | 35 | 34 | 40 |
| Evaluation of deaeration properties | Deaeration start temperature (° C.) | 40  50  60 | 40  50  60 | 40  50  60 | 40  50  60 | 40  50  60 | 40  50  60 |
|  | Preliminary pressure bonding temperature (° C.) | 70  70  70 | 70  70  70 | 70  70  70 | 70  70  70 | 70  70  70 | 70  70  70 |
|  | Bake test (Number of sheets with foaming/20 sheets) | 0  0  0 | 0  0  0 | 0  0  1 | 0  1  3 | 0  1  1 | 1  1  1 |
|  | Evaluation | ○ | ○ | ○ | ○ | ○ | ○ |

TABLE 2

|  |  | Example 7 | Example 8 | Example 9 | Comparative Example 1 | Comparative Example 2 |
|---|---|---|---|---|---|---|
| Shape of recessed grooves of raw material roll | Groove height (μm) | 80 | 200 | 200 | 250 | 250 |
|  | Width of bottom portion (μm) | 0 | 30 | 30 | 0 | 40 |
|  | Pitch interval (μm) | 190 | 300 | 300 | 300 | 400 |
|  | Angle of inclination (°) | 15 | 30 | 25 | 15 | 15 |
|  | Roll diameter (mm) | 600 | 600 | 600 | 600 | 600 |

TABLE 2-continued

|  |  | Example 7 | Example 8 | Example 9 | Comparative Example 1 | Comparative Example 2 |
|---|---|---|---|---|---|---|
|  | Axis angle of recessed groove (°) | 85 | 85 | 85 | 85 | 85 |
| Step of removing blast material | Spraying angle relative to tangential plane of roll (°) | 0 | — | — | 0 | 0 |
| Number of blast material pieces present in recessed grooves of engraved roll (pcs/mm$^2$) | After step of forming projections and recesses | 100 or more | 11 | 24 | 80 | 60 |
|  | After step of removing blast material | 2.75 | — | — | — | — |
| Number of defective projections or recesses on embossed thermoplastic resin sheet (pcs/mm$^2$) |  | 0.90 | 1.15 | 2.73 | 12.00 | 6.00 |
| Roughness of embossment at apex portion | Ra (μm) | 2.5 | 4.5 | 3.5 | 6 | 5.8 |
| Roughness of embossment | Rz (μm) | 34 | 38 | 35 | 35 | 33 |
| Evaluation of deaeration properties | Deaeration start temperature (° C.) | 40  50  60 | 40  50  60 | 40  50  60 | 40  50  60 | 40  50  60 |
|  | Preliminary pressure bonding temperature (° C.) | 70  70  70 | 70  70  70 | 70  70  70 | 70  70  70 | 70  70  70 |
|  | Bake test (Number of sheets with foaming/20 sheets) | 0  1  2 | 1  1  3 | 2  2  4 | 2  5  8 | 2  3  6 |
|  | Evaluation | ○ | ○ | ○ | x | x |

TABLE 3

|  |  |  | Example 10 | Example 11 | Example 12 | Example 13 | Example 14 | Example 15 |
|---|---|---|---|---|---|---|---|---|
| Formulation | Composition of protective layer | Bu degree (mol %) | 69 | 69 | 69 | 69 | 69 | 69 |
|  |  | OH degree (mol %) | 30 | 30 | 30 | 30 | 30 | 30 |
|  |  | Ac degree (mol %) | 1 | 1 | 1 | 1 | 1 | 1 |
|  |  | Plasticizer content (phr) | 40 | 40 | 40 | 40 | 40 | 40 |
|  | Composition of sound-insulating layer | Bu degree (mol %) | 66 | 66 | 66 | 66 | 66 | 66 |
|  |  | OH degree (mol %) | 22 | 22 | 22 | 22 | 22 | 22 |
|  |  | Ac degree (mol %) | 12 | 12 | 12 | 12 | 12 | 12 |
|  |  | Plasticizer content (phr) | 60 | 60 | 60 | 60 | 60 | 60 |
|  | Thickness | Second resin layer A (μm) | 350 | 350 | 350 | 350 | 350 | 350 |
|  |  | First resin layer (μm) | 100 | 100 | 100 | 100 | 100 | 100 |
|  |  | Second resin layer B (μm) | 350 | 350 | 350 | 350 | 350 | 350 |

TABLE 3-continued

|  |  | Example 10 | Example 11 | Example 12 | Example 13 | Example 14 | Example 15 |
|---|---|---|---|---|---|---|---|
| Shape of recessed grooves of raw material roll | Groove height (μm) | 250 | 330 | 250 | 250 | 250 | 80 |
|  | Width of bottom portion (μm) | 0 | 15 | 40 | 40 | 40 | 5 |
|  | Pitch interval (μm) | 300 | 200 | 400 | 400 | 400 | 220 |
|  | Angle of inclination (°) | 15 | 15 | 15 | 15 | 15 | 15 |
|  | Roll diameter (mm) | 600 | 600 | 600 | 600 | 600 | 600 |
|  | Axis angle of recessed groove (°) | 85 | 85 | 85 | 85 | 85 | 85 |
| Step of removing blast material | Spraying angle relative to tangential plane of roll (°) | 0 | 0 | 0 | 15 | 10 | 10 |
| Number of blast material pieces present in recessed grooves on engraved roll (pcs/mm$^2$) | After step of forming projections and recesses | 80 | 100 or more | 60 | 60 | 60 | 100 or more |
|  | After step of removing blast material | 0.30 | 0.71 | 0.20 | 2.75 | 1.45 | 2.83 |
| Number of defective projections or recesses on embossed thermoplastic resin sheet (pcs/mm$^2$) |  | 0.04 | 0.09 | 0.02 | 0.24 | 0.13 | 0.67 |
| Roughness of embossment at apex portion | Ra (μm) | 2.3 | 2.5 | 3.5 | 2.5 | 2.4 | 3.5 |
| Roughness of embossment | Rz (μm) | 33 | 35 | 34 | 35 | 33 | 40 |
| Evaluation of deaeration properties | Deaeration start temperature (° C.) | 40  50  60 | 40  50  60 | 40  50  60 | 40  50  60 | 40  50  60 | 40  50  60 |
|  | Preliminary pressure bonding temperature (° C.) | 70  70  70 | 70  70  70 | 70  70  70 | 70  70  70 | 70  70  70 | 70  70  70 |
|  | Bake test (Number of sheets with foaming/20 sheets) | 0   0   0 | 0   0   0 | 0   0   1 | 1   1   2 | 1   1   1 | 1   1   2 |
|  | Evaluation | ○ | ○ | ○ | ○ | ○ | ○ |
| Visual evaluation of optical distortion | 25° C. | ○ | ○ | ○ | ○ | ○ | ○ |
| Optical distortion value | 25° C. | 1.40 | 1.40 | 1.40 | 1.41 | 1.45 | 1.48 |

TABLE 4

|  |  |  | Example 16 | Example 17 | Example 18 | Comparative Example 3 | Comparative Example 4 |
|---|---|---|---|---|---|---|---|
| Formulation | Composition of protective layer | Bu degree (mol %) | 69 | 69 | 69 | 69 | 69 |
|  |  | OH degree (mol %) | 30 | 30 | 30 | 30 | 30 |

TABLE 4-continued

|  |  | Example 16 | Example 17 | Example 18 | Comparative Example 3 | Comparative Example 4 |
|---|---|---|---|---|---|---|
| Composition of sound insulation layer | Ac degree (mol %) | 1 | 1 | 1 | 1 | 1 |
|  | Plasticizer content (phr) | 40 | 40 | 40 | 40 | 40 |
|  | Bu degree (mol %) | 66 | 66 | 66 | 66 | 66 |
|  | OH degree (mol %) | 22 | 22 | 22 | 22 | 22 |
|  | Ac degree (mol %) | 12 | 12 | 12 | 12 | 12 |
|  | Plasticizer content (phr) | 60 | 60 | 60 | 60 | 60 |
| Thickness | Second resin layer A (μm) | 350 | 350 | 350 | 350 | 350 |
|  | First resin layer (μm) | 100 | 100 | 100 | 100 | 100 |
|  | Second resin layer B (μm) | 350 | 350 | 350 | 350 | 350 |
| Shape of recessed grooves of raw material roll | Groove height (μm) | 80 | 200 | 200 | 250 | 250 |
|  | Width of bottom portion (μm) | 0 | 30 | 30 | 0 | 40 |
|  | Pitch interval (μm) | 190 | 300 | 300 | 300 | 400 |
|  | Angle of inclination (°) | 15 | 30 | 25 | 15 | 15 |
|  | Roll diameter (mm) | 600 | 600 | 600 | 600 | 600 |
|  | Axis angle of recessed groove (°) | 85 | 85 | 85 | 85 | 85 |
| Step of removing blast material | Spraying angle relative to tangential plane of roll (°) | 0 | — | — | 0 | 0 |
| Number of blast material pieces present in recessed grooves of engraved roll (pcs/mm²) | After step of forming projections and recesses | 100 or more | 11 | 24 | 80 | 60 |
|  | After step of removing blast materials | 2.75 | — | — | — | — |
| Number of defective projections or recesses on embossed thermoplastic resin sheet (pcs/mm²) |  | 0.97 | 1.35 | 2.70 | 11.50 | 6.50 |
| Roughness of embossment at apex portion | Ra (μm) | 2.5 | 5.5 | 6.3 | 5.5 | 6.3 |
| Roughness of embossment | Rz (μm) | 45 | 40 | 35 | 33 | 33 |
| Evaluation of deaeration properties | Deaeration start temperature (° C.) | 40  50  60 | 40  50  60 | 40  50  60 | 40  50  60 | 40  50  60 |
|  | Preliminary pressure bonding temperature (° C.) | 70  70  70 | 70  70  70 | 70  70  70 | 70  70  70 | 70  70  70 |
|  | Bake test (Number of sheets with foaming/20 sheets) | 1  1  3 | 1  2  4 | 1  3  4 | 3  5  13 | 3  5  10 |
|  | Evaluation | ○ | ○ | ○ | x | x |

TABLE 4-continued

|  |  | Example 16 | Example 17 | Example 18 | Comparative Example 3 | Comparative Example 4 |
|---|---|---|---|---|---|---|
| Visual evaluation of optical distortion | 25° C. | ○ | ○ | ○ | x | x |
| Optical distortion value | 25° C. | 1.49 | 1.56 | 1.79 | 3.50 | 2.21 |

TABLE 5

|  |  |  | Example 19 | Example 20 | Example 21 | Example 22 |
|---|---|---|---|---|---|---|
| Formulation | Composition of protective layer | Bu degree (mol %) | 69 | 68.5 | 69 | 70 |
|  |  | OH degree (mol %) | 30 | 31 | 30.7 | 29 |
|  |  | Ac degree (mol %) | 1 | 0.5 | 0.3 | 1 |
|  |  | Plasticizer content (phr) | 36 | 36 | 37.5 | 39 |
|  | Composition of sound insulation layer | Bu degree (mol %) | 66 | 67.5 | 71 | 77.7 |
|  |  | OH degree (mol %) | 24.5 | 24.5 | 23 | 20.8 |
|  |  | Ac degree (mol %) | 10.5 | 8 | 6 | 1.5 |
|  |  | Plasticizer content (phr) | 75 | 75 | 76 | 77 |
| Thickness | | Second resin layer A (μm) | 350 | 350 | 350 | 350 |
|  |  | First resin layer (μm) | 100 | 100 | 100 | 100 |
|  |  | Second resin layer B (μm) | 350 | 350 | 350 | 350 |
| Shape of recessed grooves of raw material roll | | Groove height (μm) | 250 | 250 | 250 | 250 |
|  |  | Width of bottom portion (μm) | 0 | 0 | 0 | 0 |
|  |  | Pitch interval (μm) | 300 | 300 | 300 | 300 |
|  |  | Angle of inclination (°) | 15 | 15 | 15 | 15 |
|  |  | Roll diameter (mm) | 600 | 600 | 600 | 600 |
|  |  | Axis angle of recessed groove (°) | 85 | 85 | 85 | 85 |
| Step of removing blast material | | Spraying angle relative to tangential plane of roll (°) | 0 | 0 | 0 | 0 |
| Number of blast material pieces present in recessed grooves on engraved roll (pcs/mm²) | | After step of forming projections and recesses | 80 | 80 | 80 | 80 |
|  |  | After step of removing blast materials | 0.30 | 0.30 | 0.30 | 0.30 |
| Number of defective projections or recesses on embossed thermoplastic resin sheet (pcs/mm²) | | | 0.03 | 0.01 | 0.03 | 0.02 |
| Roughness of embossment at apex portion | | Ra (μm) | 3.2 | 3.3 | 2.5 | 2.6 |

TABLE 5-continued

| | | Example 19 | | | Example 20 | | | Example 21 | | | Example 22 | | |
|---|---|---|---|---|---|---|---|---|---|---|---|---|---|
| Roughness of embossment | Rz(μm) | 37 | | | 38 | | | 40 | | | 40 | | |
| Evaluation of deaeration properties | Deaeration start temperature (° C.) | 40 | 50 | 60 | 40 | 50 | 60 | 40 | 50 | 60 | 40 | 50 | 60 |
| | Preliminary pressure bonding temperature (° C.) | 70 | 70 | 70 | 70 | 70 | 70 | 70 | 70 | 70 | 70 | 70 | 70 |
| | Bake test (Number of sheets with foaming/20 sheets) | 0 | 0 | 0 | 0 | 0 | 0 | 0 | 0 | 0 | 0 | 0 | 0 |
| | Evaluation | | ○ | | | ○ | | | ○ | | | ○ | |
| Visual evaluation of optical distortion | 25° C. | | ○ | | | ○ | | | ○ | | | ○ | |
| Optical distortion value | 25° C. | | 1.36 | | | 1.39 | | | 1.41 | | | 1.38 | |

INDUSTRIAL APPLICABILITY

The present invention can provide an embossed thermoplastic resin sheet that is capable of enhancing deaeration during production of laminated glass and suppressing optical distortion of the resulting laminated glass to improve the visibility when used as an interlayer film for laminated glass, an engraved roll used for production of the embossed thermoplastic resin sheet, a production method of the engraved roll, an interlayer film for laminated glass including the embossed thermoplastic resin sheet, and a laminated glass.

REFERENCE SIGNS LIST

1. Roll
2. Blast gun

The invention claimed is:

1. A method for producing an engraved roll by a blasting method, the method comprising:
   a step of forming an uneven pattern by spraying a blast material to a raw material roll having recessed grooves formed in parallel with one another in the circumferential direction, the blasting material being sprayed at an angle of 20° or smaller relative to a line connecting the tip of a blast gun and the axis of the raw material roll while rotating the raw material roll; and
   a step of removing the blast material remaining in the recessed grooves by spraying the blast material at an angle of ±20° or smaller relative to a tangential plane direction of the roll and in a direction in parallel with the recessed grooves of the roll, while rotating the roll having the uneven pattern.

* * * * *